March 13, 1951    O. C. WINZEN ET AL    2,545,248
CARGO LANDING APPARATUS
Filed Oct. 4, 1945      7 Sheets-Sheet 1
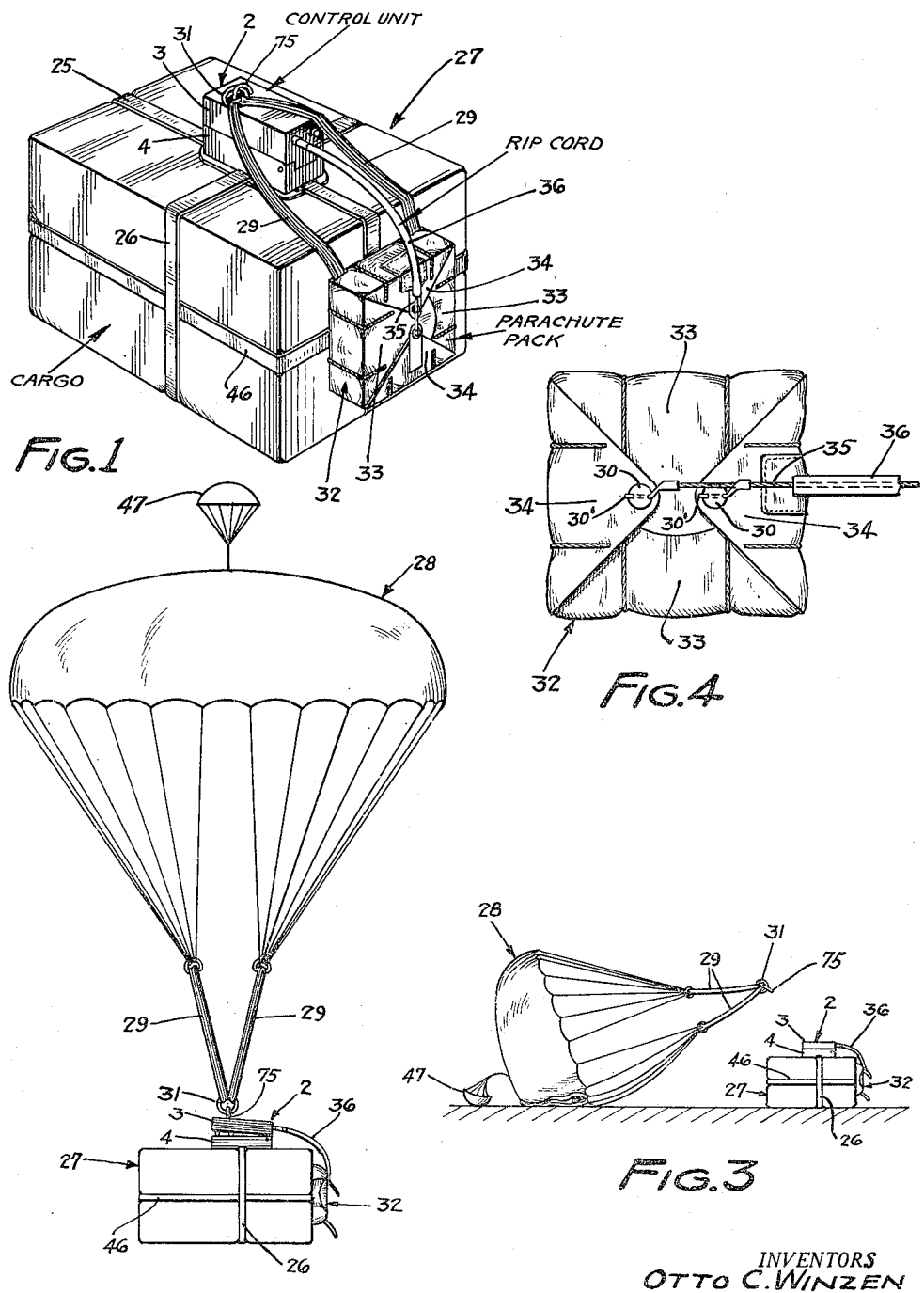
INVENTORS
OTTO C. WINZEN
VERA H. WINZEN
BY
Paul, Paul + Moore
ATTORNEYS March 13, 1951  O. C. WINZEN ET AL  2,545,248
CARGO LANDING APPARATUS
Filed Oct. 4, 1945  7 Sheets-Sheet 2

INVENTORS
OTTO C. WINZEN
VERA H. WINZEN
BY Paul, Paul & Moore
ATTORNEYS

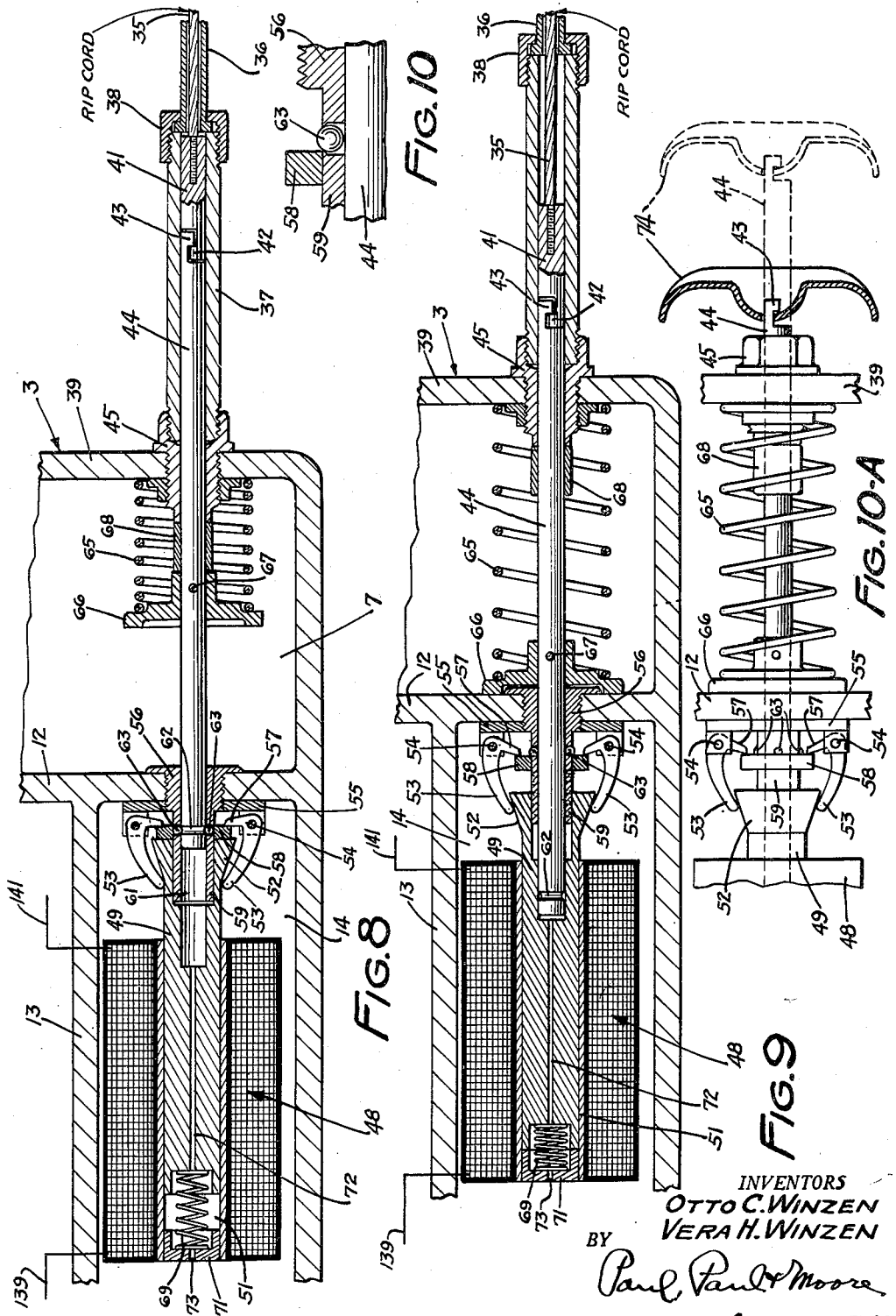

March 13, 1951 — O. C. WINZEN ET AL — 2,545,248
CARGO LANDING APPARATUS
Filed Oct. 4, 1945 — 7 Sheets-Sheet 4
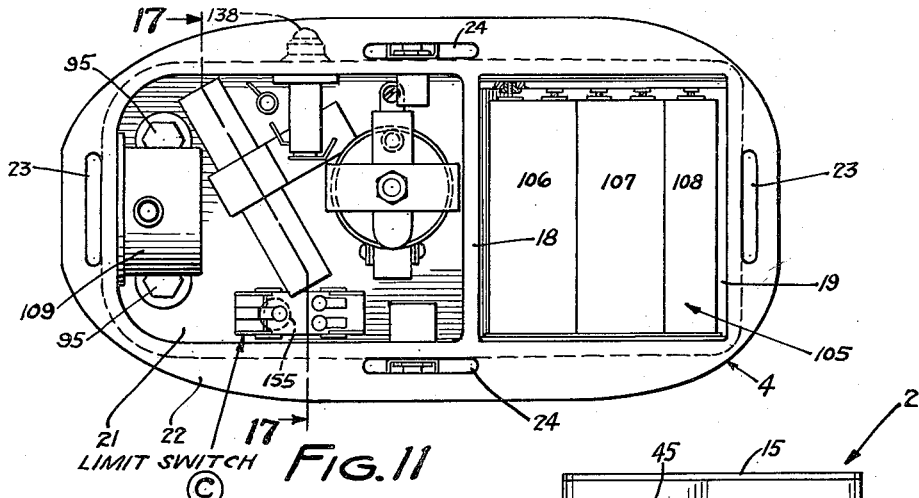
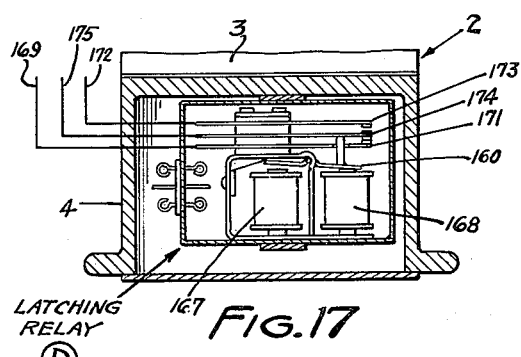
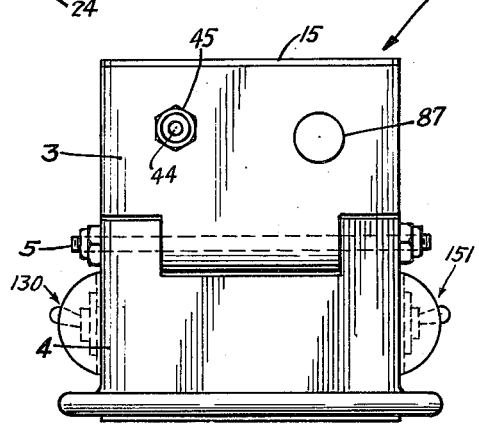
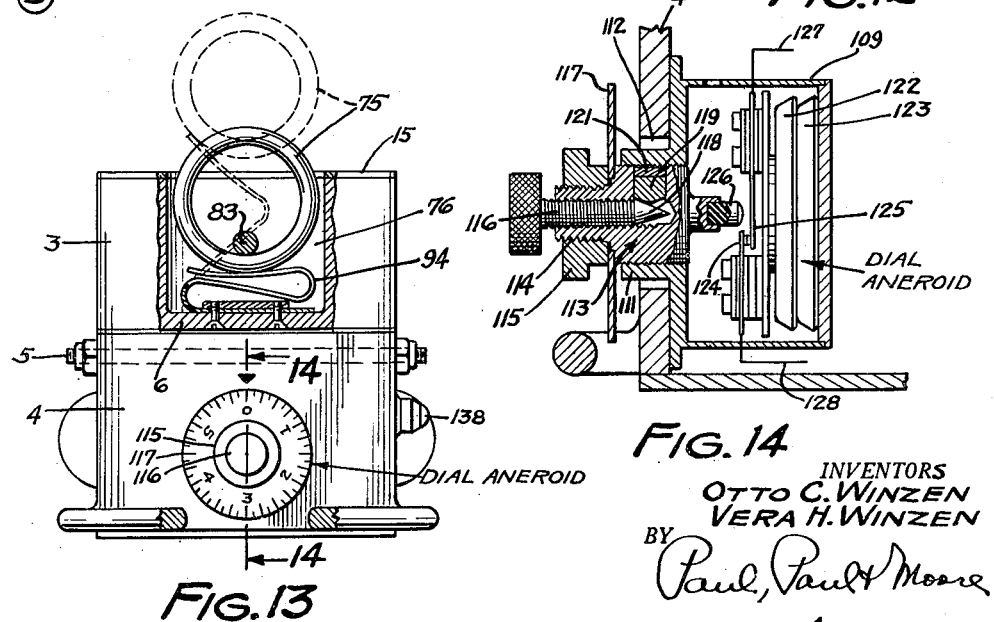
INVENTORS
OTTO C. WINZEN
VERA H. WINZEN
BY Paul, Paul & Moore
ATTORNEYS March 13, 1951     O. C. WINZEN ET AL     2,545,248
CARGO LANDING APPARATUS Filed Oct. 4, 1945     7 Sheets-Sheet 5

INVENTORS
OTTO C. WINZEN
VERA H. WINZEN
BY Paul, Paul & Moore
ATTORNEYS

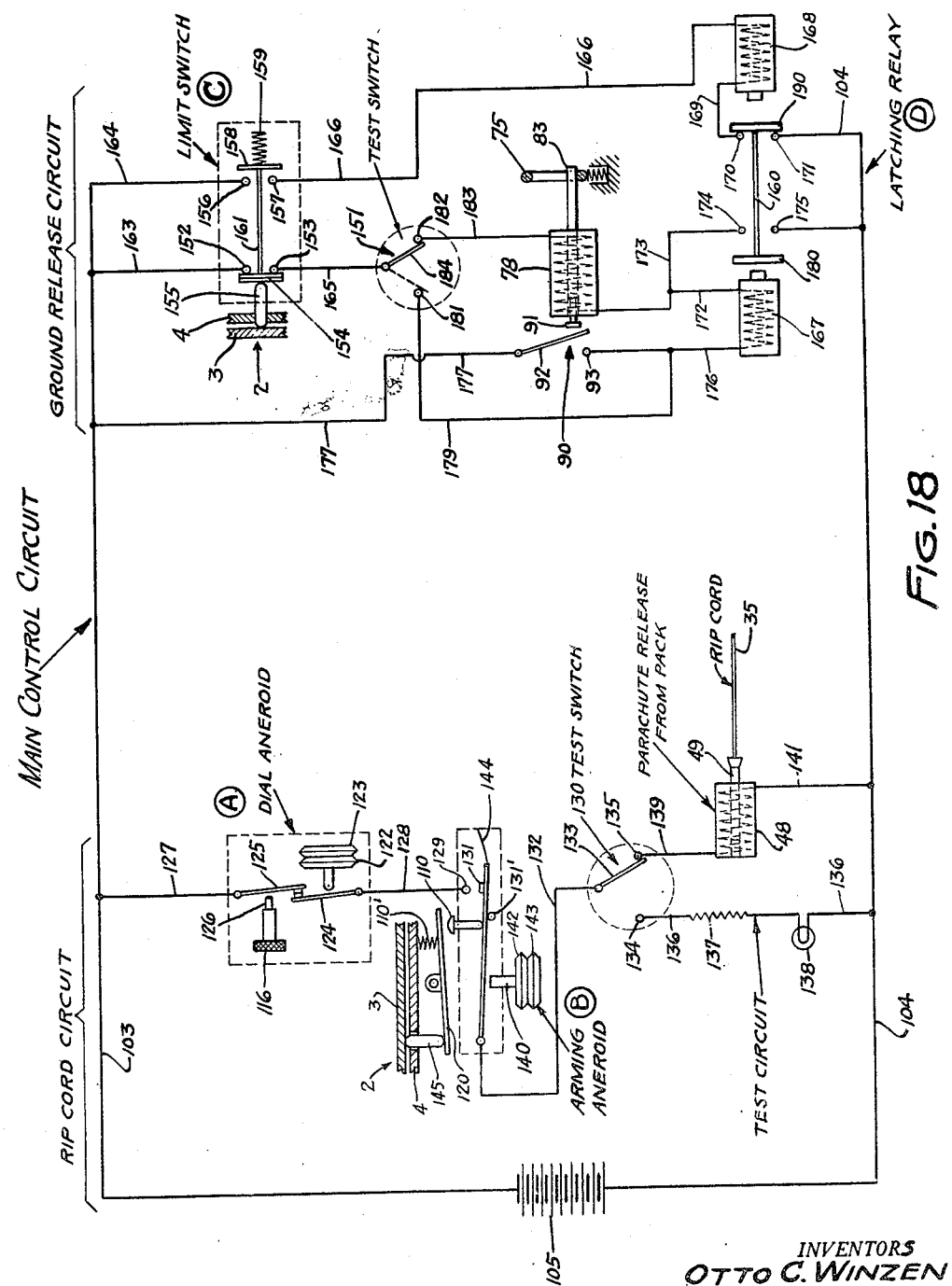

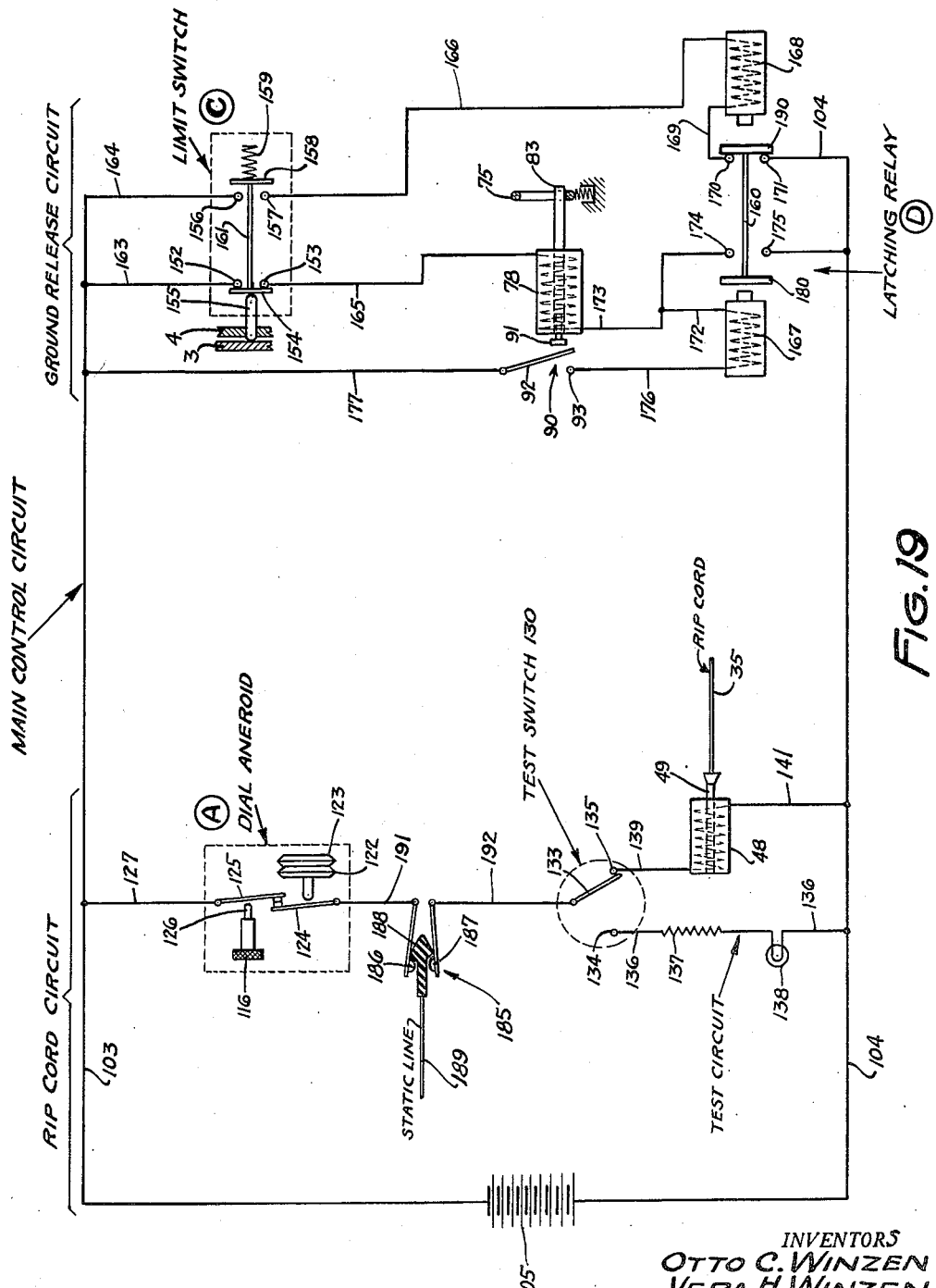

Patented Mar. 13, 1951

2,545,248

UNITED STATES PATENT OFFICE 2,545,248

CARGO LANDING APPARATUS

Otto C. Winzen and Vera H. Winzen,
Minneapolis, Minn.

Application October 4, 1945, Serial No. 620,274

12 Claims. (Cl. 244—138)

This invention relates to new and useful improvements in aerial cargo landing apparatus, and more particularly to such an apparatus which will assure good accuracy in the delivery of aerial cargoes.

It is well known to those familiar with aerial transportation of supplies, equipment, and other commodities, that accuracy in delivery an aerial cargo often presents a serious problem. To protect an aerial cargo from damage upon landing, the descent of such a cargo is usually controlled by a supporting parachute which is attached to the cargo and is of sufficient size to adequately retard the downward descent or fall of the cargo, when the parachute is released to prevent damage to the cargo when it contacts the ground.

Many factors will influence the course of a descending parachute, among which are wind directions and velocity, which may sometimes cause a descending parachute and its cargo to come to earth many miles from its intended destination.

This is particularly true when the cargo is dropped or discharged from planes flying at high altitudes, such as twenty thousand feet or more, which may be necessary in times of war when transporting supplies and equipment over enemy territory, in order that the transport planes may be out of reach of enemy anti-aircraft guns, but are still able to drop supplies to troops in confined areas.

Another difficulty frequently experienced in the delivery or landing of aerial chargoes has been to prevent the cargo from being dragged along the ground by the parachute, upon landing, which may often seriously damage the cargo or load to the extent that it may no longer be fit for its intended use. Frequently upon landing, the slightest wind may so deflect the enlarged canopy of the parachute whereby it will become, in effect, a sail that may drag its cargo over the ground with damaging results.

When possible, aerial cargoes are usually dropped from planes flying at low altitudes, but in times of war, and when low clouds, fog and bad weather obscure the ground, making it necessary to use radar in determining the position of the cargo landing place, such deliveries of aerial cargoes are, of course, impractical and exceedingly dangerous. In such cases, it therefore becomes necessary to drop aerial cargoes from planes while flying at high altitudes whereby the planes may be out of range of enemy gun fire, or flying above the weather.

Attempts have heretofore been made to provide means adapted for use in conjunction with an aerial cargo having a supporting parachute secured thereto, whereby the parachute is not released from its pack, secured to the cargo, until the free-falling cargo reaches a predetermined low altitude in its downward course, thereby to assure relatively greater accuracy in the delivery of the cargo than has heretofore been possible, when dropping aerial cargoes from high flying planes and permitting the parachute to open immediately following the release of the cargo from the plane, but to the best of our knowledge, attempts to provide completely automatic means for aerial cargo delivery have not proven entirely satisfactory.

The present invention is the result of considerable experimental and development work in an attempt to provide a simple and practical mechanism adapted for use in conjunction with an aerial cargo and its supporting parachute, whereby a cargo may be delivered to a predetermined destination with reasonable accuracy and with the assurance the cargo will not be dragged from its point of delivery upon landing.

An important object of the present invention therefore is to provide an improved control apparatus adapted for use in conjunction with a cargo supporting parachute to automatically effect the release of the parachute from its pack and permit it to open, when the cargo and parachute reach a predetermined altitude in their downward descent, whereby the open parachute will retard the downward movement of the cargo to the extent that the cargo is not likely to become damaged when it subsequently contacts the ground, and also whereby the pilot may be assured that the cargo will reach its predetermined destination.

Another object of the present invention is to provide a relatively simple control unit which can be maintained in condition and stored in large numbers for immediate use. A particular advantage of this control unit is that it can be used for the aerial delivery of bulky and heavy cargoes of odd sizes and shapes, including pieces of ordnance, guns, vehicles, etc.

A further object is to provide an aerial cargo landing apparatus including a parachute normally contained within a conventional pack secured to the cargo, and a control mechanism or unit being carried by the cargo and having a pressure responsive element therein connected to the usual rip cord of the parachute, said element being adapted to be actuated by variations in barometric pressure, whereby when the cargo reaches a predetermined elevation in its downward flight, the usual rip cord of the parachute is actuated to automatically effect the release of the parachute from its pack, whereby the parachute unfolds to load-carrying position, and safely carries the cargo to its destination.

Another important object of the invention is to provide a cargo landing apparatus including a parachute and a control mechanism for automatically releasing the parachute from its supporting pack, when the falling cargo reaches a predetermined altitude in its downward flight, and said control mechanism being so constructed that it may be pre-set before the load-carrying plane takes off with its load, and whereby it will require no further attention on the part of the pilot or crew.

A further object is to provide a control mechanism of this general type which may be attached directly to the cargo and has an operative connection with a parachute pack also secured to the cargo, whereby the cargo, control instrument or mechanism, and the parachute provide an integral unit which may readily and conveniently be handled in a plane, and which does not require any physical connections with the plane, as in the usual form of cargo delivery wherein a static line has one end attached to the plane and its opposite end to the parachute pack, the present invention being in the form of an independent unit, whereby the cargo may be dropped from any desired place in the plane, and also whereby the cargo may readily be dropped from an open door of the bomb bay, and in the case of heavy bombing planes, from the shackles of the usual bomb bay, and whereby the bomb sight may be employed to effect accurate delivery of the cargo.

A further and more specific object is to provide an apparatus of this general type comprising a solenoid of small size and force (approximately two pounds) for releasing a relatively larger force (fifty pounds) to effect the automatic release of the parachute when the cargo container strikes the ground upon landing.

A further object is to provide an automatically operable mechanism for securing the usual risers of a parachute to a cargo, which mechanism is so constructed that when the cargo contacts the ground upon landing, said mechanism will automatically release the parachute from the cargo, thereby to prevent the parachute from dragging the cargo along the ground in the event of strong side winds, such release of the parachute from the cargo also causing the parachute to quickly completely collapse, whereby damage thereto is reduced to a minimum.

A further and more specific object of the invention is to provide an apparatus for operatively connecting a parachute to a cargo, said apparatus being in the form of a box-like structure comprising upper and lower members pivotally connected together at one end and adapted for limited pivotal movement, the lower member being secured to the cargo and the upper member having means for detachably connecting it to the usual risers of a parachute, and a control device being carried by one of said members and adapted to be actuated by relative pivotal movement of said members to automatically effect the release of the risers of the parachute from the control unit, the instant the cargo contacts the ground.

A further object is to provide a control apparatus of the class described comprising an electric circuit having a plurality of control elements inter-connected therein, certain of which are made operable by variations in barometric pressures to automatically effect opening or closing of certain control switches during the downward flight of the cargo, whereby when the free-falling cargo descends to a predetermined altitude, high enough above ground to allow ample time for the parachute to open and break the fall of the cargo, as, for example, two thousand feet, said control apparatus will automatically actuate the rip cord and release the parachute carried by the cargo, thereby to permit the parachute to open and safely carry the cargo to its predetermined destination, and when the cargo engages the ground, the control apparatus will operate to automatically completely release the parachute from the cargo, whereupon the cargo will remain where delivered, and the parachute will quickly collapse and come to rest within close range of the cargo.

A further object is to provide in an instrument of the class described, comprising a control mechanism for automatically effecting the release of a parachute from its pack at a predetermined altitude, said mechanism comprising its own power source whereby it is not dependent upon the power source of the plane for its operation, and whereby said control mechanism and parachute, including the cargo, constitute a complete self-contained unit which may readily be moved about in the plane, if desired, and whereby the operation of dropping the cargo from the plane may be facilitated.

A further object is to provide a cargo landing apparatus, including a control unit, comprising a plurality of control elements and electric circuits so arranged and interconnected that when the control apparatus is in respose on the ground or in a plane before the takeoff, all of its electric circuits will be open to the source of electric energy.

Other objects of the invention reside in the unique orientation of the various control elements and their interconnections, whereby the entire apparatus may be confined within a small compact container which may readily be secured to a cargo or load to prepare it for aerial transportation; in the electro-magnetic means for actuating the rip cord of the parachute at a predetermined altitude; and in the unique arrangement of the various control corcuits and elements embodied therein, which are open at the take off; in the novel means provided for securing the lower ends of the risers of the parachute to the control unit, and the means associated therewith for automatically releasing the risers from the control apparatus and the cargo when the cargo engages the ground; in the novel construction of the various control devices embodied in said apparatus; in the provision of a control unit of the class described, which comprises few parts and control elements, all of which are of simple and inexpensive construction, whereby the entire apparatus readily lends itself for manufacture in quantity production at low cost; in the provision of such an apparatus which is highly efficient and practical in operation whereby a pilot may accurately deliver aerial cargoes of various forms and sizes to predetermined destinations, including rescue or life boats, and underwater mines, and the like, and all such equipment having means embodied therein for cooperating with means on the control mechanism to automatically release such equipment from the cargo, when the cargo contacts the ground upon landing.

These and other objects of the invention and the means for their attainment will be more apparent from the following description taken in connection with the accompanying drawings.

In the accompanying drawings there has been disclosed a structure designed to carry out the various objects of the invention, but it is to be understood that the invention is not confined to the exact features shown, as various changes may be made within the scope of the claims which follow.

In the drawings:

Figure 1 is a perspective view of a cargo showing the parachute and its control apparatus secured thereto prior to placing the cargo in a plane;

Figure 2 is a view showing the cargo in its downward or free-falling flight, supported by the parachute;

Figure 3 is a view showing the release of the parachute from the cargo when the cargo engages the ground;

Figure 4 is a plan view of the parachute pack with the parachute enclosed therein, and showing the means for operatively connecting the rip cord to the flaps of the pack;

Figure 8 is an enlarged detail sectional view on the line 8—8 of Figure 6, showing the rip cord actuating mechanism in cocked position;

Figure 9 is a similar view, but showing the positions of the parts after the solenoid has been energized to actuate the rip cord and release the parachute from its supporting pack;

Figure 10 is an enlarged fragmentary detail sectional view of a portion of the coupling means of the rip cord actuating mechanism shown in Figures 8 and 9;

Figure 10A is an enlarged detail view showing the means for manually resetting or cocking the operating rod of the rip cord;

Figure 11 is a bottom view of the control apparatus or unit showing the locations of the various control elements in the lower member thereof;

Figure 12 is an end view of the control unit showing the hinge between the upper and lower members thereof;

Figure 13 is a view of the opposite end of the control unit partially broken away to more clearly illustrate the connection between the risers of the parachute, and the control unit showing the dial for setting the cargo release aneroid to effect the release of the cargo at a predetermined altitude;

Figure 14 is an enlarged detail sectional view on the line 14—14 of Figure 13, showing the means for setting the dial in accordance with sea level, and also for adjusting the dial to cause the control unit to operate and release the cargo at the selected altitude;

Figure 17 is a detail sectional view substantially on the line 17—17 of Figure 11 showing the latching relay;

Figure 18 is a wiring diagram showing the various control elements of the electric circuit as positioned before the take off; and Figure 19 is a wiring diagram showing the use use of a jack or pull-out plug in lieu of the high altitude aneroid shown in Figure 18.

Control unit

Figure 15:
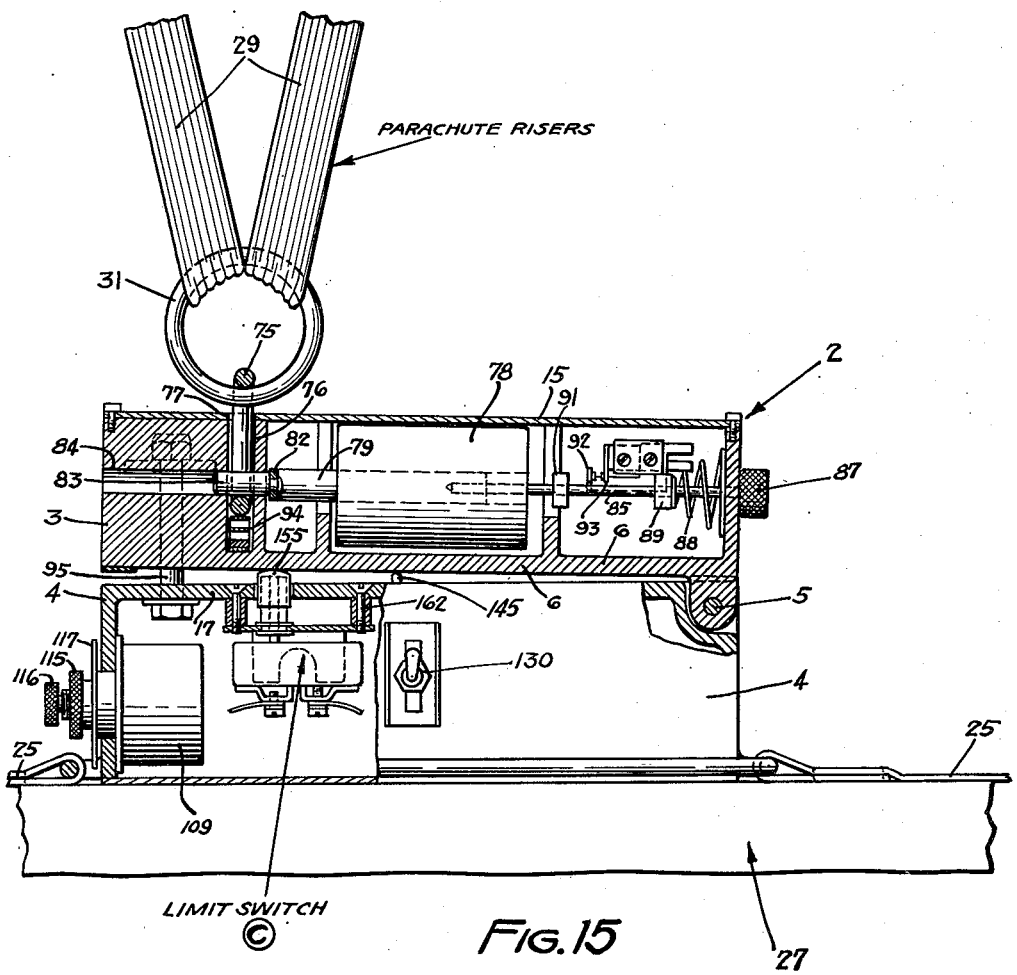
Figure 15 is a view similar to Figure 6, showing the hinged members or jaws of the control unit in "open" position, as when the cargo is in flight.

The novel cargo landing apparatus herein disclosed is shown comprising a control unit, generally designated by the numeral 2, including upper and lower members 3 and 4, respectively, shown pivotally connected together at one end by a suitable pivot pin 5, as clearly illustrated in Figures 12 and 15.

Figure 5:
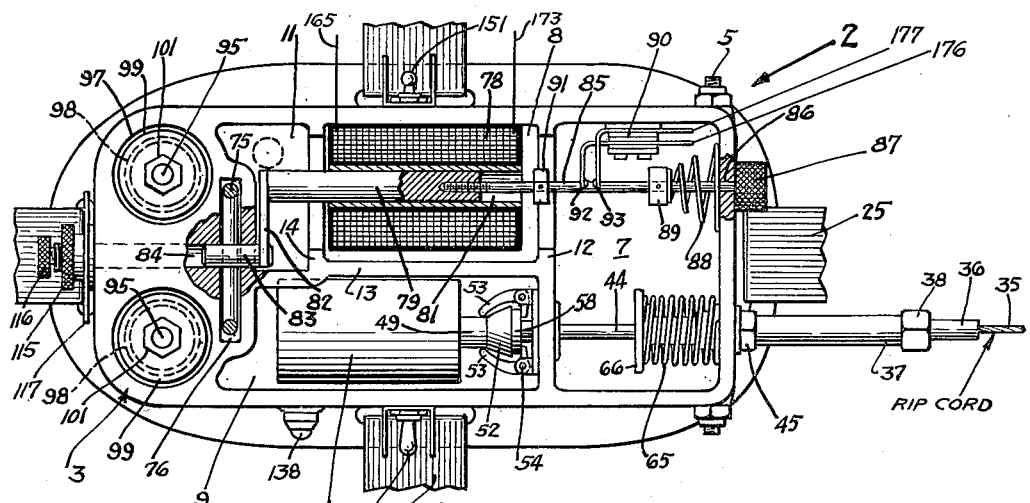
Figure 5 is a plan view of the control apparatus or unit with the upper cover plate removed to show the interior construction of the upper member and the arrangement of the control elements therein.

The upper member 3 has a bottom wall 6 and its interior is shown divided into a plurality of chambers 7, 8, 9 and 11, by a plurality of walls 12, 13 and 14, as best shown in Figure 5. The open top of the upper jaw 3 is normally closed by a suitable cover plate 15, secured thereto by such means as screws or bolts 16, whereby the cover plate may readily be detached, when desired.

The lower member 4 is in the form of an inverted box, and has a top wall 17 and a cross wall 18 dividing the interior thereof into chambers 19 and 21, as shown in Figure 11. The lower member 4 also has an annular horizontal flange 22 adjacent to its bottom provided at its ends with elongated openings 23, and similar openings 24 are provided in said flange at the front and rear of the lower member. The openings or slots 23 and 24 cooperate to receive suitable tie straps 25 and 26, respectively, for securing the control unit or apparatus to a cargo, generally designated by the numeral 27.

Cargo supporting parachute

To protect the cargo from damage upon landing, it is customary to attach a parachute to the cargo which is of ample size to adequately support and retard the descent of the cargo and carry it safely to its destination without danger of the cargo becoming damaged upon landing. The parachute, generally designated by the numeral 28, is shown provided with the usual risers 29 having their lower ends secured to a metallic ring 31 to facilitate securing the risers to the control unit 2.

The standard personal type parachute 28 is normally contained in a conventional pack 32, formed with a plurality of flaps 33—33 and 34—34 adapted to be folded over one another to close the pack about the parachute, as is well known in the art. See Figures 1 and 4. A suitable rip cord 35 has one end operatively connected to the flaps of the parachute pack 32 by suitabl eelements 30, as best illustrated in Figure 4. The securing elements are of conventional construction, and are so designed that when a pull is exerted on the rip cord 35, the pins 30' of the rip cord are pulled out of engagement with the elements 30, whereby the flaps of the pack 32 are opened to release the parachute from the pack. A flexible tubular housing 36 encloses the rip cord 35, and has one end secured to the pack 32, as shown in Figure 4, and its opposite end is shown detachably secured to one end of a sleeve 37 by a suitable coupling member 38, as shown in Figures 8 and 9. The opposite end of the sleeve 37 is detachably secured to the adjacent end wall 39 of the upper member 3 of the control unit 2.

The end of the rip cord adjacent to the sleeve 37 is shown suitably secured to one end of a short coupling member 41 having its opposite end 42 arranged to interlock with the adjacent end 43 of a rip cord operating rod 44 slidably mounted in the sleeve 37 and in a threaded bushing or fitting 45 secured in the end wall 39 of the upper jaw, and which secures the sleeve 37 to the upper member 3 of the control unit, as clearly illustrated in Figures 8 and 9.

The parachute pack 32 is suitably secured to the cargo by such means as the straps 25, 26 and 46, whereby the empty pack remains with the cargo when the parachute is subsequently released to retard the downward descent of the cargo, when the cargo is released from the plane. A pilot parachute of conventional construction, generally designated by the numeral 47, may be secured to the top of the cargo carrying parachute in the usual manner, and is adapted to be folded into the pack 32 with the relatively larger parachute 28, when the pack 32 is closed in preparation for the takeoff, as is well known. When the rip cord 35 is actuated to release the parachute from its pack, the pilot parachute is first released to the atmosphere and instantly opens, and thereby withdraws the cargo carrying parachute from the pack whereupon air enters the canopy of the larger parachute 28 and quickly opens it, as shown in Figure 2.

Rip cord actuating means

The means for actuating the rip cord 35 to release the parachute from its pack at the predetermined altitude, is best shown in Figures 8 and 9, and comprises a solenoid 48 shown suitably fixed in the chamber 14 of the upper member 3. The solenoid is shown provided with a plunger 49 mounted for reciprocal movement in the bore 51 of the solenoid. The plunger 49 is provided at its outer end with a frusto-conical head 52 adapted to actuate a pair of opposed toggle levers 53, pivoted at 54 to a fixed support 55 secured to a flanged bushing 56, shown received in threaded engagement with the partition 12. The long arms of the levers 53 engage the periphery of the frusto-conical head 52 of the plunger 49, and the inwardly directed relatively shorter arms 57 engage a collar 58 mounted on a tubular extension 59 of the bushing 56.

The adjacent end of the rip cord operating rod 44 is slidably mounted in the bore 61 of the bushing 56, and has an annular groove 62 in its periphery adapted to receive opposed spherical coupling elements 63 mounted in suitable retaining apertures 64 provided in the wall of the tubular extension 59 of the bushing 56. The diameter of the spherical coupling elements or balls 63 is relatively greater than the thickness of the wall of the tubular extension 59, as shown in Figure 10, whereby when the collar 58 is positioned over the balls 63, as shown in Figure 8, the balls enter the groove 62 in the rip cord operating rod 44 and lock it in its cocked or operative position ready to actuate the rip cord and release the parachute from its pack, the instant the solenoid 48 is energized, as will subsequently be described.

The force exerted upon the operating rod 44 to actuate the rip cord to effect the release of the parachute, is shown comprising a relatively stiff spring 65 having one end seated against the end wall 39 of the upper member 3 of the control unit, and its opposite end against a flanged head 66, fixedly secured to the operating rod 44 by suitable means such as a pin 67. A suitable stop collar 68 is mounted on the rod 44 between the ends of the head 66 and bushing 45 to limit outward movement of the rod 44 and to align the slot 62 with the coupling elements or balls 63, when the rod 44 is outwardly pulled, as shown in Figure 8.

A small spring 69 is shown provided within the bore of the solenoid 48 and has one end seated against the adjacent end of the plunger 49 and its opposite end against a cap or plug 71, suitably secured in the end of the bore 51, as will be understood by reference to Figures 8 and 9. The spring 69 serves to outwardly move the plunger 49 from the position shown in Figure 9 to that shown in Figure 8, when the operating rod 44 is manually re-set to condition the parachute for another flight, whereby the frusto-conical head of the plunger is moved into position to effect a locking connection between the rod 44 by the toggle locking mechanism shown in Figures 8 and 9.

In Figure 8 the rip cord operating rod 44 is shown in its cocked position and is locked in such position as a result of the spherical coupling elements 63 entering the annular groove 62 in the rod, thereby locking the rod to the fixed bushing 56, whereby the spring 65 is placed under pressure, as will be understood by reference to Figure 8. When, however, the solenoid 48 is energized, its plunger 49 is instantly drawn into the bore of the solenoid against the limit stop or plug 71 provided at the opposite end of the solenoid bore. Such action of the plunger actuates the toggle coupling mechanism shown in Figures 8 and 9, whereby the collar 58 thereof releases the balls 63 from the annular groove in the rod 44 and permits the spring 65 to instantly actuate the rod 44 and move it towards the solenoid 48, as shown in Figure 9. Such action of the rod 44 will exert a pull upon the rip cord 35 and withdraw the pins 30' from the flap securing elements 30 of the parachute pack, and thereby release the parachute from its pack. Suitable vents 72 and 73 are provided respectively in the plunger 49 of the solenoid 48 and plug 71 secured in the end of the solenoid bore 51, thereby to prevent the formation of a vacuum or pressure within the bore of the solenoid as a result of the reciprocal movement of the plunger 49 and operating rod 44.

To reset or cock the rip cord operating rod 44, the tubular housing 36 is detached from the sleeve 37, and the sleeve 37 may then be detached from the bushing 45 whereupon the coupling element 41 of the rip cord may be disengaged from the rod 44, as will be understood by reference to Figure 10A. The tubular housing 36 of the rip cord is sufficiently compressible in a lengthwise direction to permit the sleeve 37 to be pulled outwardly with respect to the operating rod 44 to permit the coupling element 41 to be detached therefrom.

An important feature of the rip cord operating mechanism, above described, resides in the unique construction of the toggle type coupling means shown in Figures 8 and 9, which makes it possible to effect the release of the powerful rip cord actuating spring 65 by the use of a solenoid having a comparatively light pulling force. In other words, the plunger 49 of the solenoid 48 may be axially translated to operate the toggle levers 53 to cause them to release the operating rod 44 from the bushing 56, by a magnetic pull on the plunger 49 of approximately two pounds, whereas the spring 65, when set or cocked, as shown in Figure 8, may be under a compression or force of approximately fifty pounds, or more. It will thus be seen that by means of the toggle coupler shown in Figures 8 and 9, ample power may be stored up in the spring 65 to assure positive actuation of the rip cord when the spring 65 is released to free the parachute from the pack at the desired elevation, as will later be described.

The rip cord operating rod 44 may be manually reset each time the spring 65 has been released. To thus reset or cock the rod 44, a suitable hand grip, generally designated by the numeral 74, is detachably secured to the end of the operating rod 44, as shown in Figure 10A. An operator or attendant then grasps the handle 74 and outwardly pulls the rod 44 to the position shown in full lines in Figure 8 and dotted lines in Figure 10A. When the rod has thus been pulled to its outermost position, limited by the head 66 engaging the stop collar 68, the relatively lighter spring 69 at the opposite end of the plunger 49 will cause the plunger to follow the rod 44, whereby the head 52 of the plunger will engage the collar 56 and move it into locking engagement with the balls 63 of the toggle coupler, as best shown in Figure 8. When the parts are so positioned, the coupling member 41 is coupled to the end of the operating rod 44, and the sleeve 37 is secured to the bushing 45, after which the coupling element 38 of the tubular housing 36 is secured to the end of the sleeve 37.

Ground release for parachute

Another important feature of the present invention resides in the means provided for automatically releasing the parachute from the control unit, when the cargo contacts the ground upon landing. This is an extremely important feature of the apparatus, in that it eliminates the danger of the parachute dragging the cargo over the ground upon landing, which may frequently occur when utilizing conventional landing equipment, should the parachute become tilted in a windward direction and permit the wind to blow it along the ground, as if it were a huge sail attached to the cargo. By automatically releasing the parachute from the control unit as herein disclosed, the instant the cargo contacts the ground, both cargo and parachute are protected against damage to which they otherwise would be subjected.

Figure 6:
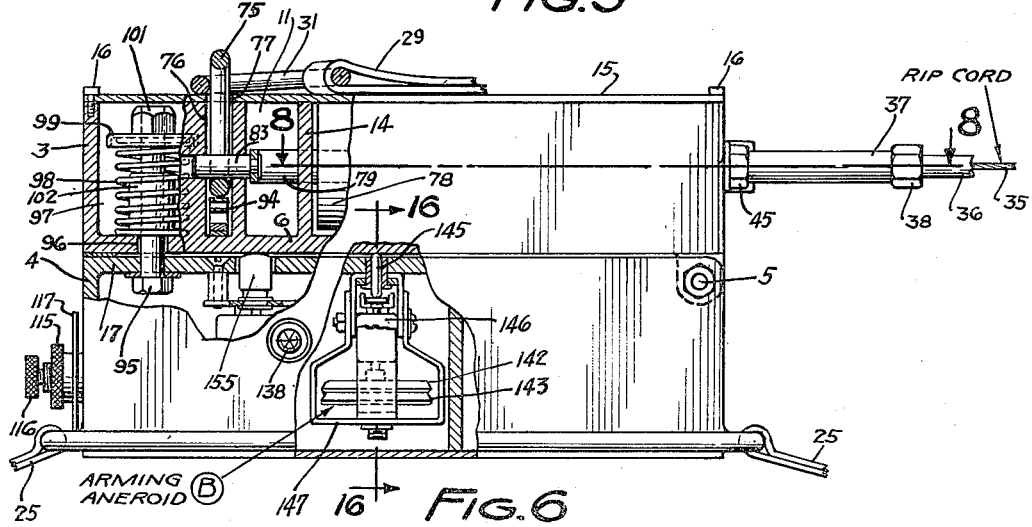
Figure 6 is a front elevation of Figure 5, partially broken away to show the means for operatively connecting the control unit to the risers of the parachute, said means being shown in operative position.
Figure 7:
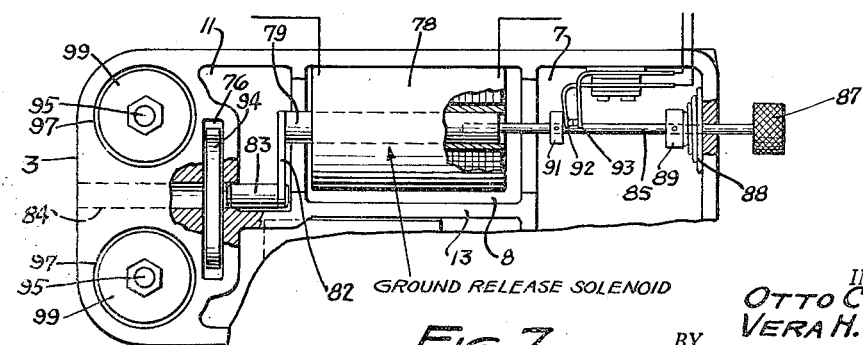
Figure 7 is a partial plan view similar to Figure 5, but showing the solenoid for connecting the parachute to the control apparatus and cargo energized to release the parachute from the cargo, and whereby a circuit is momentarily closed to the latching relay.

As best illustrated in Figures 5, 6 and 15, the ring 31 to which the risers 29 of the parachute are secured, is shown having an auxiliary ring 75 interlocked therewith adapted to be inserted into a well or cavity 76 provided in the upper member 3 of the control unit 2, as best illustrated in Figures 6 and 15. The well 76 is always open to the atmosphere even when the cover plate 15 is in position upon the member 3, as said plate has an opening 77 registering with the top of the well 76.

A suitable solenoid 78 is shown mounted in the chamber 8 of the upper member 3 and has a plunger 79 mounted for reciprocal movement in the usual bore 81 of the solenoid 78. An arm 82 is secured to and laterally extends from one end of the plunger 79 and has a pin 83 secured thereto and disposed in parallel relation relative to the plunger 79. The pin 83 is mounted for sliding movement in a bore 84 which intersects the well 76, as will be clearly understood by reference to Figures 5, 6 and 15. The arm 82 of the plunger 79 is mounted for relative movement within the chamber 11 to cause the crank 83 to intersect the well 76 and thus secure the parachute to the control unit.

A rod 85 has one end secured to the opposite end of the plunger 79 and traverses the chamber 7. The opposite end of the rod 85 is supported in a guide 86 in the end wall 39 of the upper member 3, as clearly illustrated in Figure 5. A suitable finger grip or knob 87 is secured to the projecting end of the rod 85, whereby the rod may readily and conveniently be manipulated to manually operate the plunger 79 to move the pin 83 into or out of locking engagement with the auxiliary ring 75 of the parachute.

A suitable spring 88 has one end engaging the end wall 39 of the upper unit member 3, and its opposite end engages a collar 89 secured to the rod 85, whereby the spring 88 constantly urges the plunger 79 in a direction to move the coupling pin 83 into position to secure the parachute to the control unit. The finger knob or grip 87 provides means whereby an operator or attendant may readily manipulate the plunger 79 to secure the parachute to the control unit or to manually release it therefrom. An insulating collar 91, preferably of insulating material, is secured to the rod 85 adapted to engage a movable contact 92 and move it into electrical engagement with a fixed contact 93, when the solenoid 78 is momentarily energized to withdraw the pin 83 from engagement with the ring 75 of the parachute risers 29 to free the parachute from the control unit. The contacts 92 and 93 constitute means for momentarily closing a circuit to a latching relay subsequently to be described.

To insure quick release of the parachute from the control unit 2, a suitable spring 94 is shown secured at the bottom of the well 76 which constantly exerts an upward thrust on the ring 75, whereby when the pin 83 is actuated to release the ring 75, the spring 94 will quickly eject the ring 75 from the well 76 to completely free the parachute from the cargo. When thus freed, the parachute quickly collapses, usually within a few feet of the cargo.

Main control circuit

Another important feature of the invention resides in the control circuit and the orientation of the various electrical instruments embodied therein for automatically effecting the release of the parachute from its pack, when the free falling cargo reaches a pre-determined altitude, and also whereby the parachute is automatically released from the cargo, when the cargo contacts the ground upon landing.

The control circuit or wiring diagram, shown in Figure 18, comprises two instruments of the aneroid type, generally designated by the reference characters A and B. These two instruments cooperate to control the release of the parachute from its pack when the cargo reaches a predetermined altitude in its downward flight.

To facilitate explanation, the composite circuit shown in Figure 18 may be divided into two circuits, one for actuating the rip cord to release the parachute from its pack, which will hereinafter be referred to as the "rip cord circuit," and the other circuit containing the necessary instruments for effecting the automatic release of the parachute from the cargo upon landing, which will hereinafter be referred to as the "ground release circuit."

Rip cord circuit

As diagrammatically illustrated in Figure 18, the rip cord circuit comprises the aneroid A, which will hereinafter be referred to as the "dial aneroid," and aneroid B, which will hereinafter be referred to as the "arming aneroid." The arming aneroid functions to present a circuit to the dial aneroid when the plane reaches an altitude well above the altitude at which the dial aneroid effects the release of the parachute from its pack during the descent of the cargo from the plane.

The arming aneroid B and also the limit switch C are partially dependent upon the relative movement of the upper and lower members 3 and 4 of the control unit 2 for their complete operation, and this feature constitutes an important phase of the present invention.

Means is provided for limiting relative movement of the upper member 3 of the control unit with respect to its complemental lower member 4, and is shown comprising bolts 95 having their lower ends anchored to the top wall 17 of the lower member 4 and extending upwardly therefrom through suitable apertures 96 provided in the bottom wall 6 of the upper member 3, into circular wells or cavities 97 provided in the upper member, as best illustrated in Figures 5 and 6.

A suitable spring 98 is shown coiled about each bolt 95 and have their lower ends seated against the bottom wall 6 of the upper member 3 and their upper ends against suitable washers or plates 99. Nuts 101 are received in threaded engagement with the upper ends of the bolts 95. The springs 98 are under sufficient tension to retain the hinged members 3 and 4 of the control unit in closed position, as shown in Figure 6, when the control unit is manually handled in the operation of attaching it to the cargo in preparation for flight.

The tension of the springs 98 is such, however, that when the cargo is dropped from the plane and the parachute is released from its pack, as a result of the dial aneroid A closing its contacts, 124 and 125, the weight of the suspended cargo plus the weight of the lower member 4, of the control unit 2, will open the members 3 and 4, as shown in Figure 15. Suitable collars 102 are shown mounted on the bolts 95 within the springs 98 for limiting the amount of opening of the upper member 3 with respect to the lower member 4, as will be understood by reference to Figures 15 and 6. Electric current may be supplied to the various electrical instruments of the control circuits by a pair of electric conductors 103 and 104 leading from a suitable source of electric power, such as a battery 105, which may consist of several cells 106, 107 and 108, supported within the chamber 19 of the lower member 4 of the control units, as shown in Figure 11.

Dial aneroid A

Another important feature of the invention resides in the provision of the dial aneroid A in the circuit. This instrument controls the automatic release of the parachute from its pack, when the free falling cargo drops to a predetermined altitude, as, for example, two thousand feet above the ground. The dial aneroid A, as best shown in Figures 14 and 15, comprises a housing 109 adapted to be secured to an end wall of the lower member of the control unit by suitable means, not shown. The housing 109 preferably has a tubular extension 111 passing through an opening 112 in the wall of the lower member 4.

The extension 111 is internally threaded to receive an enlarged end portion of a bushing, generally designated by the numeral 113. The bushing 113 also has a reduced threaded extension 114 exteriorly threaded to receive a lock nut 115, and interiorly threaded to receive an adjusting needle or lock screw 116 which functions to lock the bushing 113 against relative rotation within the extension 111, when the dial aneroid has been adjusted to the desired elevation at which to effect the release of the parachute, at the location where the cargo is to be dropped.

An annular shoulder is provided on the bushing 113 between the enlarged and reduced threaded end portions thereof adapted to receive a suitable dial 117 which may be clamped in fixed position on the bushing 113 by the lock nut 115, as will readily be understood by reference to Figure 14. The pointed terminal 118 of the adjusting screw 116 is adapted to engage a plug 119 and impart outward radial movement thereto to force a soft metallic or plastic element 121 into frictional engagement with the threaded bore of the extension 111, thereby to secure all of the parts in fixed adjusted positions.

The dial aneroid A is shown comprising two bellows 122 and 123 on which are mounted a pair of contacts 124 and 125, as illustrated in Figure 14. The contacts are suitably insulated from the bellows, and the bellows are completely evacuated whereby when the plane is on the ground, as before the takeoff, the bellows are in their contracted state, whereby the contacts 124 and 125 are in circuit-closing contact with one another, as illustrated in Figures 14 and 18.

The threaded bushing 113 carries an insulated plug 126 which may be axially translated by manual rotation of the bushing 113 to engage the contact 125 and move it out of contact with its complemental contact 124. A wire 127 connects the contact 125 to the wire 103 of the main control circuit, and a wire 128 connects the contact 124 to a fixed contact 129 of the arming aneroid or bellows B, as schematically illustrated in Figure 18.

Arming aneroid B

In the rip cord circuit diagram of Figure 18, the contact 129 of the arming aneroid is arranged to be electrically engaged by a movable contact 131 having a wire 132 connecting it to a test switch, generally indicated by the numeral 130. The test switch comprises a movable contact 133, to which the wire 132 is connected, and fixed contacts 134 and 135. A wire 136 leads from the fixed contact 134 and is shown having a suitable resistance 137 connected therein and also a pilot light 138. The opposite end of wire 136 is electrically connected to the conductor 104.

The fixed contact 135 of the test switch 130 has a wire 139 electrically connecting it to one end of the rip cord solenoid 48, the opposite end of which is connected by a wire 141 to the conductor 104.

The bellows 142 and 143 of the arming aneroid B are compressed at ground level, whereby the actuating pin 140 thereof is retracted as shown in Figure 18, thereby to permit the movable contact 131 to be moved into circuit opening position against a stop 131'. The movable contact 131 is adapted to be retained in open or closed position by an over-the-center device diagrammatically indicated at 144 in Figure 18.

The bellows 142 and 143 are so designed that they do not effect closing of the contacts 129 and 131 until the plane has reached an elevation well above the two thousand foot elevation at which it is desired to release the parachute during the subsequent free falling of the cargo from the plane. In other words, to assure proper functioning of the apparatus, the arming aneroid is preferably so set so as not to close the contacts 129 and 131 until the plane reaches an elevation of approximately six thousand feet, whereupon the movable contact 131 is moved into engagement with the fixed contact 129 by the expansion of the bellows 142 and 143, after which the movable contact 131 may be retained in closed position by the over-the-center device 144. Such closing of the contacts 129 and 131 will condition a circuit to the rip cord solenoid 48, but the circuit cannot be completed until the falling cargo reaches the altitude at which the dial aneroid is set, as, for example, two thousand feet, whereupon the contacts 124 and 125 are actuated to close the circuit through the dial aneroid. It will thus be seen that when the falling cargo reaches the two thousand foot elevation, the circuit to the rip cord is completed whereupon the solenoid 48 is energized and actuates the rip cord to effect the automatic release of the parachute from its pack 32. The cargo is then conveyed to its destination by the parachute, as shown in Figure 2.

Figure 16:
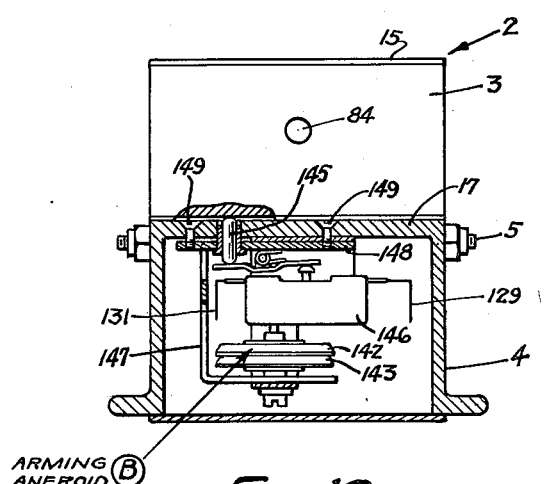
Figure 16 is a detail sectional view substantially on the line 16—16 of Figure 6, showing the means for opening the contacts of the arming aneroid, when the hinged members or jaws of the control unit are in closed position, as illustrated in Figure 6.

When the main parachute opens, and retards the falling velocity of the cargo, the two sections 3 and 4 of the control unit open, as shown in Figure 15, and thereby actuate a rocker 120 having one end positioned to be engaged by the thrust pin 145, shown in Figures 16 and 18. The opposite end of the rocker 120 is arranged to engage the reset button 110 of the arming aneroid, thereby to open the rip cord circuit through the contacts 129 and 131. A suitable spring 110' is arranged to exert a rocking motion to the rocker 120 to actuate the reset button 110 when the opposite end of the rocker is released by the pin 145.

As hereinbefore stated, the arming aneroid B is adapted to be partially actuated by the closing action of the members 3 and 4 of the control unit, as a result of the push button 145 which is shown mounted for sliding movement in a guide opening provided in the top wall 17 of the lower member 4 of the control unit 2. In Figure 16, the arming aneroid B is shown in its commercial form. It preferably includes a small housing 146 for supporting its contacts 129 and 131, and a bracket 147 for supporting the bellows 142 and 143. The upper end of the bracket 147 is shown secured to a horizontal plate 148, whereby the arming aneroid may readily be secured to the top wall 17 of the control unit by such means as screws 149. The function of the arming aneroid is to maintain the rip cord circuit open at low altitudes, and to be certain that the rip cord circuit is open when the cargo has been delivered at its destination.

Ground release circuit

The ground release circuit shown in Figure 18 comprises the limit switch C, solenoid 78 for releasing the parachute from the cargo upon landing, the latching relay D, and preferably a manually operable check switch 151 for checking the condition of the latching relay before the takeoff.

Limit switch C

The limit switch is schematically illustrated in Figure 18, and is shown in its commercial form in Figure 15. It is preferably in the form of a single-pole-double-throw switch, and comprises dual contacts 152 and 153 arranged to be bridged by a contact member 154. The contact member 154 is adapted to be actuated by a push button 155, when the members 3 and 4 of the control unit 2 close, as when the cargo strikes the ground upon landing.

The limit switch also comprises contacts 156 and 157 adapted to be bridged by a movable contact member 158, shown having a spring 159 constantly urging it in a direction to bridge the gap between the contacts 156 and 157. The contact members 154 and 158 are shown secured together for simultaneous operation by a rod or member 161. The limit switch in its commercial form, shown in Figures 11 and 15, is of the spring-actuated type, whereby when the members 3 and 4 of the control unit 2 are in open position, as shown in Figure 15, the push button 155 is released and the spring 159 may then shift the rod 161 to the left, when viewed as shown in Figure 18, whereupon the contact member 158 bridges the gap between contacts 156 and 157, and simultaneously, the electric connection between the contacts 152 and 153 is broken as a result of the contact member 154 moving out of electrical engagement with its contacts 152 and 153.

The limit switch C may be secured to the top wall 17 of the lower member 4 of the control unit by suitable screws 162, shown in Figure 15. Contacts 152 and 153 of the limit switch are shown electrically connected to the conductor 103 of the main control circuit by suitable wires 163 and 164, respectively, as shown in the wiring diagram. Contact 153 has a wire 165 connecting it to the movable contact arm of a suitable check switch 151, and contact 157 of the limit switch has a wire 166 connecting it to the latching relay D, next to be described.

Latching relay D

The latching relay D, schematically illustrated in Figures 18 and 19, is shown in its commercial form in Figures 11 and 17, and comprises a pair of small relay coils 167 and 168. Wire 166 connects contact 157 of the limit switch C with one end of the relay coil 168, and a wire 169 connects the opposite end of coil 168 to a fixed contact 170.

Contact 170 has a complemental contact 171 spaced therefrom and electrically connected to the conductor 104. Relay coil 167 has a wire 172 connecting one end thereof to a wire 173 having one end connected to the parachute release solenoid 78 and its opposite end to a fixed contact 174, spaced from a complemental contact 175. A wire 176 connects the opposite end of relay coil 167 to the fixed contact 93 of switch 90. A member 160 is shown provided at its ends with suitable contact-bridging elements 180 and 190, adapted to alternately engage the pairs of contacts 170—171 and 174—175, when the relay coils 167 and 168 are alternately energized, as will subsequently be described.

In Figure 19 there is illustrated a main control circuit which is somewhat simpler in form than the one shown in Figure 18, in that a simple pull-out switch, generally designated by the numeral 185, has been substituted for the arming aneroid B. It will also be noted that the manually operable check switch 151, shown in Figure 18, has been eliminated.

The pull-out or jack form of switch 185 is shown comprising spring contacts 186 and 187, normally spaced apart by a pull-out plug 188 of insulating material, having one end of a static line 189 secured thereto. The opposite end of the static line 189 is secured to a fixed part of the plane for reasons later to be explained. A wire 191 connects the contact 186 to the contact 124 of the dial aneroid A, and a wire 192 similarly connects contact 187 to the movable contact 133 of the test switch 130, shown in the rip cord circuit of Figure 19.

Operation

When the novel cargo landing apparatus herein disclosed is to be utilized for accurately delivering an aerial cargo to its destination, the control unit 2 is secured to the cargo by the straps 25 and 26, as shown in Figure 1, and the parachute pack is similarly secured to the cargo, preferably at one end thereof, by the same straps 25 and 26. The main parachute 28 and pilot parachute 47 are packed within the pack 32, whose flaps are then folded into closing relation, as shown in Figures 1 and 4, and secured in such positions by the fastening elements 30—30' of the rip cord 35, as best shown in Figure 4.

When preparing the control unit 2 for a takeoff, the annular ring 75 secured to the risers 29 of the main parachute through the medium of the ring 31, are operatively attached to the control unit by manually manipulating the control knob 87 to insert the coupling pin 83 through the ring 75, as clearly illustrated in Figures 5, 6 and 16. The spring 88 interposed between the collar 89 and the end wall 39 of the upper unit normally retains the coupling pin 83 in its operative position, and in so doing also retains the armature 79 of solenoid 73 in its projected position, shown in Figures 5 and 15.

It is to be understood that when the control unit is prepared for a flight, and is in repose on the ground or in a plane, all of the control circuits thereof are open so that the various electrical devices embodied therein are cut off from the supply of electric energy.

In ordinary times, a control unit such as herein disclosed may not be necessary, but in times of war, cargo carrying planes must be flown at high altitudes to be out of range of enemy anti-aircraft batteries. To assure accurate delivery of the cargo to its destination, the supporting means for the main parachute is so constructed and arranged that the parachute is not released from the cargo until the free falling cargo reaches a predetermined low altitude in its downward course, as, for example, two thousand feet. To assure the release of the parachute at the desired elevation, the dial aneroid A is adjusted by manipulation of the knob 116 to cause the contacts 124 and 125 thereof to electrically engage one another when the cargo reaches an elevation of two thousand feet in the downward course of the cargo, whereupon a circuit is completed to the solenoid 48.

The operation of the apparatus is perhaps best explained by referring to the electrical circuits shown in Figures 18 and 19. In these figures the various electrical devices are shown in the positions assumed before the takeoff, say at an elevation of fifty feet above sea level.

In the rip cord circuit shown in Figure 18, two aneroids are utilized, the dial aneroid A and the arming aneroid B. In the ground position, the contacts 124 and 125 of the dial aneroid are electrically engaged with one another, since the entire unit is now at an elevation below two thousand feet for which the dial aneroid has been manually set to function. However, the arming aneroid contacts 129 and 131 are in circuit opening position, whereby the rip cord release solenoid 48 is inoperative.

If desired, the rip cord circuit may be tested prior to the take off by subjecting the arming aneroid to a condition simulating an elevation of six thousand feet or more. This may be accomplished by placing the arming aneroid in a vacuum chamber, whereby its bellows 142 and 143 are expanded to close the rip cord circuit through its contacts 129 and 131. The test switch 130 is then manually actuated to move its contact 133 into engagement with the fixed contact 134. Then by manually separating the upper and lower sections 3 and 4 of the control unit 2 and allowing them to return to their normal closed positions, the rip cord circuit is put through one complete cycle of operation, except that instead of actuating the rip cord solenoid 48, the test light 138 is lighted momentarily, provided all of the various control elements of the rip cord circuit are in proper operating condition. Should the test light indicate that the rip cord circuit is in proper operating condition, movable contact 133 of the test switch 130 is returned to its circuit closing position in engagement with its complemental fixed contact 135.

In similar fashion, the correction for barometric pressure before flight is made at the dial aneroid. In the test circuit position, knob 116 is loosened to free the bushing 113, and the knob 115 is then turned to the point where test bulb 133 lights up, and the knob 116 is then fastened again. The lock nut 115 is next loosened to free dial disc 117. Assuming that the takeoff field is at an elevation of fifty feet above sea level, the dial is then moved until the pointer is opposite the fifty foot graduation. Thereafter, lock nut 115 is fastened again.

Corrections may thus be made also for the anticipated barometric pressure of the landing place; however this is necessary only if that pressure is known to vary greatly from the one at the point of takeoff, as may occur during severe storms.

To set the unit for the release operation, knob 116 is loosened and the lock nut 115 is then turned until the dial is set to the proper elevation. Assuming that the cargo landing area also has an elevation of fifty feet above sea level, the dial may be set to two thousand feet, at which altitude it will then release the parachute while the cargo drops to earth. After the adjustment is made, knob 116 again locks the entire movement of the dial aneroid securely in position.

After the airplane which carries the cargo has left the ground, the following changes occur in the rip cord circuit: At two thousand foot elevation, the dial aneroid bellows 122 and 123 will open contacts 124 and 125. At six thousand foot elevation, bellows 142 and 143 of the arming aneroid will have expanded to where they close contacts 129 and 131. While the plane is flying towards its destination, this circuit is therefore always open.

When the cargo is subsequently released from the airplane, it executes a free fall to an elevation of two thousand feet above the ground. At that elevation the dial aneroid bellows 122 and 123 will have contracted to the position (original dial setting) where contacts 124 and 125 become closed. This completes the rip cord circuit with the result that rip cord solenoid 48 is energized and the sequence of mechanical operations described hereinbefore takes place whereby the parachute is ultimately opened. This entire parachute opening operation may require but from one to two seconds from the time the parachute is released from its pack until its canopy 28 is fully inflated as shown in Figure 2.

Immediately upon the opening of the parachute, the upper and lower members 3 and 4 of the control unit 2 are separated, as described heretofore, with the result that plunger 145 is allowed to operate, thereby permitting contacts 129 and 131 to open again. This breaks the rip cord circuit again. No change in the circuit takes place upon landing of the cargo.

In the ground release circuit the following changes take place during operation: Before the takeoff and while the cargo is attached to the plane in flight, the upper and lower members 3 and 4 of the control unit 2 are in their closed positions, best shown in Figure 6, whereby the operating pin 155 of the limit switch C is positioned to bridge the contacts 152 and 153 of the limit switch, as shown in Figures 18 and 19. The circuit to the ground release solenoid 78, however, is not complete since the contacts 174 and 175 of the latching relay are in open position.

When the cargo, including the preset control unit 2 and the concealed parachute, is initially released from the plane, it proceeds on its downward course until it reaches the two thousand foot elevation, whereupon the circuit through the rip cord solenoid is closed to thereby effect the automatic release of the parachute from its pack. Thereafter, the cargo is supported by the parachute, as shown in Figure 1, and as the control unit 2 is suspended from the supporting ring 75 of the parachute, the upper and lower members 3 and 4 of the control unit separate, as shown in Figure 15, with the result that limit switch C will permit contacts 152 and 153 to open while contacts 156 and 157 will now be closed. As a result, the latching relay D operates since coil 168 is energized through wire 164, bridging member 158, wire 166, solenoid 168, bridging member 190 and wire 104.

Energization of the relay coil 168 will shift the member 160 to the right when viewed as shown in Figure 18, thereby causing the contact bridging member 180 to close the gap between contacts 174 and 175. Such electrical engagement of the contacts 174 and 175 merely conditions a circuit for the ground release solenoid 78, as will be understood.

The moment the cargo contacts the ground, the gap between the upper and lower members of the control unit is closed, as shown in Figure 6, whereby the pin 155 actuates the bridge member 154 to bridge the gap between contacts 152 and 153. This completes the circuit through the solenoid 78 which is then energized and withdraws the coupling pin 83 from the ring 75 of the parachute and thus automatically releases the parachute from the cargo the instant the cargo contacts the ground.

As the plunger 83 of solenoid 78 is retracted, its opposite end 91 engages the movable contact 92 of switch 90, thereby momentarily closing the circuit through switch 90. This momentary closing of switch 90 serves to energize relay coil 167, which in turn attracts member 160 and shifts it to its circuit opening position, shown in Figures 18 and 19. It will thus be noted that as soon as the cargo comes to rest on the ground, both the rip cord and ground release circuits of the control unit 2 are open to prevent further flow of current therethrough. When under this condition, the control unit is in fact, ready to be used again.

The operation of this test circuit is immediately apparent by reference to Figure 18. After the ground release circuit and its operation have been put through one test cycle by manipulation of the test switch, the movable contact 184 of the test switch 151 is restored to its electrical engagement with the fixed contact 182 prior to the takeoff.

In Figure 19 there is shown a rip cord circuit of slightly different construction wherein a jack and plug type of switch 185 is utilized in lieu of the arming aneroid B shown in Figure 18. Before the takeoff, the static line 189 secured to the plug 188 has one end securely attached to the structural member of the airplane. When the plug is inserted between the contacts 186 and 187, the circuit through wires 191 and 192 is open because of the plug 188 being of non-conductive material. However, the moment the cargo is released from the airplane, the plug 188 is pulled from its position between the contacts 186 and 187, whereupon the circuit is closed through the contacts 186 and 187, and will so remain while the cargo executes a free fall. This type of static line arming is well known in the art, particularly in the arming of aerial bombs.

After the cargo has been released from the plane, the release of the parachute from its pack is effected in identically the same manner as the form shown in Figure 18. This results because while the circuit is closed through contacts 186 and 187, it remains open through contacts 124 and 125 of the dial aneroid until the cargo drops to the two thousand foot level at which moment the dial aneroid contacts electrically engage each other and effect energization of the solenoid 48, which in turn actuates the rip cord to release the parachute, as will be understood.

If desired, a test switch 151, similar to the one shown in the ground relay circuit of Figure 18, may be utilized in the ground release circuit of Figure 19.

The foregoing detailed description has been given for clearness of understanding only, and no unnecessary limitations should be understood therefrom, but the appended claims should be construed as broadly as permissible in view of the prior art.

We claim:

1. In an aerial cargo landing apparatus, a parachute, a control unit having means for securing it to the cargo, means within the control unit for detachably securing the parachute risers thereto, a rip cord having one end operatively connected to the parachute, a solenoid within the control unit operatively connected with the opposite end of the rip cord, an electric circuit for the solenoid having a connection with a source of electric energy, a pair of contacts in said circuit, means for normally retaining said contacts in circuit-opening condition when the cargo and control unit are within a minimum of approximately six thousand feet above sea level, means whereby said circuit-opening means are rendered operative to close said contacts when the cargo is dropped from the airplane, a second pair of contacts in said circuit, a pressure responsive device associated with said second pair of contacts for maintaining said contacts in circuit-opening condition when the plane ascends to an elevation above two thousand feet above sea level, said second pair of contacts cooperating with said first pair of contacts to complete the circuit to said solenoid when the cargo reaches an elevation of two thousand feet in its free falling descent to the ground, whereby the solenoid will actuate the rip cord to automatically release the parachute from its pack, and means for pre-setting said pairs of contacts before the takeoff.

2. An aerial cargo landing apparatus in accordance with claim 1, wherein means is provided for maintaining the solenoid circuit open when the control apparatus is grounded.

3. In an aerial cargo landing apparatus, a parachute, a pack for securing the parachute to a cargo, said pack having closure means for normally maintaining the parachute within the pack, a rip cord having one end attached to said closure means, a control unit having means for securing it to a cargo, a coupling device within the control unit for coupling the parachute risers to the control unit, a solenoid in the control unit operatively associated with the rip cord, an electric circuit for energizing the solenoid, dual pairs of contacts in said circuit, and means for automatically controlling the operation of said pair of contacts, whereby a circuit to the rip cord solenoid cannot be completed until the airplane has flown to an elevation of approximately six thousand feet to effect closing of one pair of contacts and the partial closing of the solenoid circuit, and means whereby the second pair of contacts cannot close until the free falling cargo drops to an elevation of two thousand feet, whereupon the control circuit is completed to thereby effect energization of the rip cord solenoid and the automatic release of the parachute from its pack.

4. An aerial cargo landing apparatus in accordance with claim 3, wherein means is provided for pre-setting the operations of said pairs of contacts on the ground before the takeoff.

5. In an aerial cargo landing apparatus comprising a main control circuit including a rip cord circuit, and a ground release circuit, a parachute, a rip cord having one end operatively attached to the parachute, a solenoid in the rip cord circuit having a plunger slidable therein and operatively connected to the rip cord, a circuit for said solenoid having a pair of contacts therein, an insulated pull-out plug normally retaining said contacts in circuit-opening positions, a static line having one end secured to said pull-out plug, and its opposite end to a structural part of the airplane, a second pair of contacts in the solenoid circuit, a pressure responsive device normally maintaining said second pair of contacts in circuit opening position, when the cargo landing apparatus is disposed at an elevation below two thousand feet, a ground release circuit electrically associated with said rip cord circuit for effecting the automatic release of the parachute from the cargo, when the cargo contacts the ground upon landing, and means whereby said control circuits may be pre-set before the takeoff, thereby to condition the control circuits, whereby they cannot accidentally effect closing of the rip cord circuit until the free falling cargo descends to the elevation at which the control unit has been pre-set.

6. An aerial cargo landing apparatus in accordance with claim 5, wherein means is provided for effecting the automatic release of the parachute from the cargo, the instant the cargo contacts the ground.

7. An aerial cargo landing apparatus in accordance with claim 6, wherein all electric control circuits embodied in the control apparatus are so interconnected that when the apparatus is in-operative, as when placed in storage, all control circuits will be open.

8. In an aerial cargo landing apparatus, a control unit having means for securing it to a cargo, a parachute secured to the cargo, a rip cord having one end operatively connected to an operating member in the control unit and its opposite end to the parachute, a solenoid in the control unit having a plunger operatively connected to the rip cord operating member, means for locking said operating member in position to release the parachute from the cargo, and a pressure responsive device for effecting energization of said solenoid when the cargo reaches a predetermined elevation in its free falling movement, whereby the solenoid will actuate said locking means and effect the release of the rip cord operating member, whereby said member will automatically release the parachute from the cargo, said pressure responsive device being capable of being pre-set before the airplane takes off.

9. In an aerial cargo landing apparatus, a parachute, a control unit having means for securing it to a cargo, a rip cord having one end secured to an operating rod and its opposite end to the parachute, a solenoid having a plunger connected to said rod and longitudinally slidable in the solenoid, an electric control circuit for the solenoid, and a pressure responsive device in said control circuit for controlling the operation of the solenoid to effect the automatic release of the parachute when the free falling cargo reaches a predetermined elevation, said pressure responsive device being capable of being pre-set before the plane takes off.

10. In an aerial cargo landing apparatus, comprising a control unit and a parachute having means for securing them to a cargo, a rip cord having one end operatively associated with the parachute and having its opposite end connected to a rip cord operating member within the control unit, a solenoid within said unit having a plunger mounted for reciprocal movement therein, means made operable by movement of the plunger to lock said operating member in cocked position, a control circuit for the solenoid, and a pressure responsive device for effecting energization of the solenoid at a predetermined elevation, whereby the plunger is operated to release the rip cord operating member from said locking means thereby to cause said member to exert a pull on the rip cord and effect the release of the parachute, when the cargo reaches a predetermined elevation in its downward flight.

11. An aerial cargo landing apparatus comprising a control unit comprising a casing including upper and lower members hingedly connected together at one end, means for securing said casing to a cargo, a rip cord having means at one end for connecting it to the parachute, an operating device in one of said casing members to which the opposite end of the rip cord is attached, a coupling device in the upper casing member for operatively connecting the risers of the parachute thereto whereby the control unit may be suspended from the parachute during the descent of the cargo by the parachute, and means made operative when the casing contacts the ground upon landing of the cargo, to automatically effect the release of the parachute from the cargo.

12. An aerial cargo landing apparatus in accordance with claim 11, wherein the casing members are connected together for relative movement, whereby during descent of the cargo by the parachute, said casing members will open or slightly separate from one another whereby when the bottom member contacts the ground upon landing of the cargo, said members will close, the relative movement of said members causing the release mechanism for the parachute to function.

OTTO C. WINZEN.
VERA H. WINZEN.

REFERENCES CITED

The following references are of record in the file of this patent:

UNITED STATES PATENTS

| Number | Name | Date |
|---|---|---|
| 1,335,283 | Graf | Mar. 30, 1920 |
| 1,443,745 | Holt | Jan. 30, 1923 |
| 2,150,933 | McNeill | Mar. 21, 1939 |
| 2,159,186 | Tyler | May 23, 1939 |
| 2,182,547 | Tumey | Dec. 5, 1939 |
| 2,416,603 | Wilson | Feb. 25, 1947 |
| 2,504,148 | Ogden | Apr. 18, 1950 |

FOREIGN PATENTS

| Number | Country | Date |
|---|---|---|
| 129,017 | Great Britain | July 10, 1919 |
| 168,924 | Great Britain | Sept. 12, 1921 |
| 278,695 | Great Britain | Apr. 5, 1928 |